United States Patent [19]
Pinedo et al.

[11] Patent Number: 5,448,264
[45] Date of Patent: Sep. 5, 1995

[54] METHOD AND APPARATUS FOR SEPARATE WINDOW CLIPPING AND DISPLAY MODE PLANES IN A GRAPHICS FRAME BUFFER

[75] Inventors: David Pinedo; Byron Alcorn, both of Fort Collins; Desi Rhoden, Boulder, all of Colo.

[73] Assignee: Hewlett-Packard Company, Palo Alto, Calif.

[21] Appl. No.: 76,826

[22] Filed: Jun. 14, 1993

Related U.S. Application Data

[63] Continuation of Ser. No. 670,087, Mar. 15, 1991, abandoned.

[51] Int. Cl.⁶ ............................................. G09G 5/00
[52] U.S. Cl. ................................... 345/201; 345/203
[58] Field of Search ............... 340/721, 723, 724, 750, 340/798, 799; 345/27, 185, 186, 187, 188, 189, 190, 192, 193, 200, 201, 203

[56] References Cited

U.S. PATENT DOCUMENTS

| | | | |
|---|---|---|---|
| 4,808,986 | 2/1989 | Mansfield et al. | 340/799 |
| 4,857,901 | 8/1989 | Lathrop | 340/799 |
| 4,914,607 | 4/1990 | Takanashi et al. | 340/721 |
| 4,918,429 | 4/1990 | Clarke | 340/799 |
| 5,025,249 | 6/1991 | Seiler et al. | 340/721 |

OTHER PUBLICATIONS

Rogers, D. F. *Procedural Elements For Computer Graphics* N.Y., McGraw-Hill, 1985 pp. 3–15.

*Primary Examiner*—Richard Hjerpe

[57] ABSTRACT

A method and apparatus for use in a computer graphics system for the storage and retrieval of pixel information is described. The computer graphics system includes a screen display. The method and apparatus are implemented in a frame buffer, wherein the frame buffer memory is divided into a first memory section for storage of the pixel information and second and third memory sections. A clipping member provides clipping information for use in the display of the pixel information in a first region of the display screen. The clipping information is stored in the second memory section. A display mode member provides display mode information for use in the display of the pixel information in a second region of the display screen. The display mode information is stored in the third memory section. The clipping information and the display information are stored in the frame buffer memory separate from one another. The frame buffer memory preferably includes an array of VRAM devices. In such an embodiment, the second memory section is contained in a first VRAM device and the third memory section is contained in a second VRAM device. The clipping information and the display mode information are stored in physically separate VRAM devices for a given pixel. The clipping information and display information are preliminarily stored in a pixel cache and transferred to the second and third sections in response to a control signal from a controller.

11 Claims, 4 Drawing Sheets

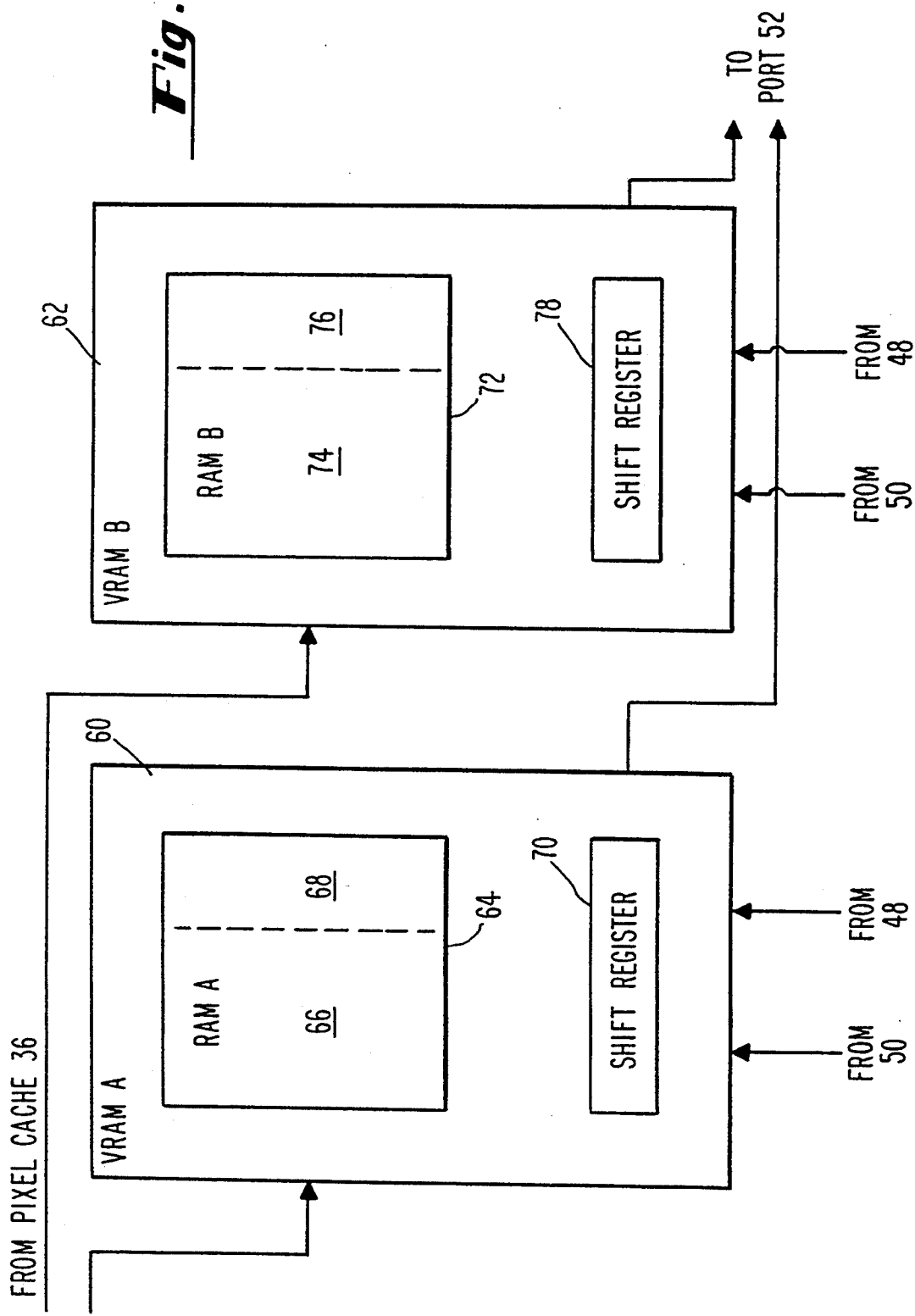

METHOD AND APPARATUS FOR SEPARATE WINDOW CLIPPING AND DISPLAY MODE PLANES IN A GRAPHICS FRAME BUFFER

This is a continuation of application Ser. No. 670,087, filed Mar. 15, 1991, now abandoned.

FIELD OF THE INVENTION

The present invention relates generally to the field of computer graphics display systems and, more particularly, to devices and techniques used in raster graphics systems for the display of pixel information from a frame buffer.

BACKGROUND OF THE INVENTION

Computer graphics systems are now available which allow the researcher to study or view various types of data as three dimensional images on a display screen. Of the three types of graphics systems available, namely, storage tube, calligraphic and raster, the present invention finds particular use in the latter. In raster graphics systems, the display screen can be thought of as an XY grid pattern. Each discrete cell or element in the grid pattern is referred to as a pixel, i.e. picture element. In raster graphics systems, each pixel can be displayed in a desired manner, i.e. brightness, color, etc. See Rogers, D.F. *Procedural Elements for Computer Graphics.* N.Y., McGraw-Hill, 1985, pp. 3-15. Due to such versatility, raster graphics systems have become quite popular.

In general, a raster graphics system includes an image creation section, an image storage section, an image display section and a raster display which can be of several types, including a cathode ray tube (CRT). In such a raster graphics system, the image creation section converts signals generated by one or more applications (computer programs) into pixel information which is stored in a frame buffer. Image information relating to each pixel, i.e. color and intensity, is written to a particular memory location in the frame buffer for eventual screen display. Such memory locations are referred to as "on screen" memory, which typically forms only a part of the overall frame buffer memory. Memory locations to which image information is not written are referred to as "off screen" memory. Pixel information is read from the frame buffer and provided to the image display section where the digital data is converted to one or more analog signals. The analog signals are designed to achieve the desired pixel image when applied to the raster display.

In computer graphics systems, some scheme must be implemented to "render" or draw graphics primitives to the display screen. A "graphics primitive" is a basic component of a graphics picture such as, for example, a polygon or vector. All graphics pictures are formed from combinations of these graphics primitives. Many schemes have been proposed to perform graphics primitives rendering, including the use of clipping information. Clipping information creates display conditions or boundaries whereby the display of pixel information is dependent upon a comparison of the screen address location of the subject pixel and the clipping information.

The frame buffer generally comprises a plurality of video random access memory (VRAM) computer chips which store pixel and clipping information corresponding to the particular graphics primitives which will be rendered to the display screen. The frame buffer will also include one or more pixel caches for intermediate storage of pixel information. Generally, the frame buffer contains all of the graphics information which will be written onto the display screen, and stores this information in the VRAMs until the graphics system is prepared to display this information.

Many graphics display options, for example fonts, color maps and indexes are stored in off screen memory on the frame buffer and such objects are identified according to frame buffer relative addresses. In the past such display options together with related clipping information have been stored in a logically contiguous single multi-bit memory plane. While such combination frame buffer storage schemes seem beneficial in order to minimize VRAM components, the problem is that versatility is lost. For example, display indexes combined with clipping information can only be used by pixels falling within the boundaries of such clipping information.

Consequently, a need exists for more flexible and maximum use of display options stored in a frame buffer.

SUMMARY OF THE INVENTION

The advantages of the invention are achieved in a method and apparatus for use in a computer graphics system for the storage and retrieval of pixel information is described. The computer graphics system includes a screen display. The method and apparatus are implemented in a frame buffer, wherein the frame buffer memory is divided into a first memory section for storage of the pixel information and second and third memory sections. A clipping member provides clipping information for use in the display of the pixel information in a first region of the display screen. The clipping information is stored in the second memory section. A display mode member provides display mode information for use in the display of the pixel information in a second region of the display screen. The display mode information is stored in the third memory section. The clipping information and the display information are stored in the frame buffer memory separate from one another.

The frame buffer memory preferably includes an array of VRAM devices. In such an embodiment, the second memory section is contained in a first set of VRAM devices and the third memory section is contained in a second set of VRAM devices. The clipping information and the display mode information associated with a given pixel are stored in physically separate VRAM devices. It is within the scope of the invention to store clipping information and display mode information associated with different pixels within the same VRAM device.

In a further embodiment the frame buffer includes a pixel cache and a controller for generating control signals representative of pixel information transfer commands for transferring pixel information from the pixel cache to the frame buffer memory. In such an embodiment the clipping information and display information are preliminarily stored in the pixel cache and transferred to the second and third sections in response to the control signal.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which:

FIG. 4 is a more detailed block diagram of a VRAM device depicted in FIG. 3 utilized in an alternate embodiment of the invention.

DETAILED DESCRIPTION OF THE PREFERRED EMBODIMENT

Figure 1:
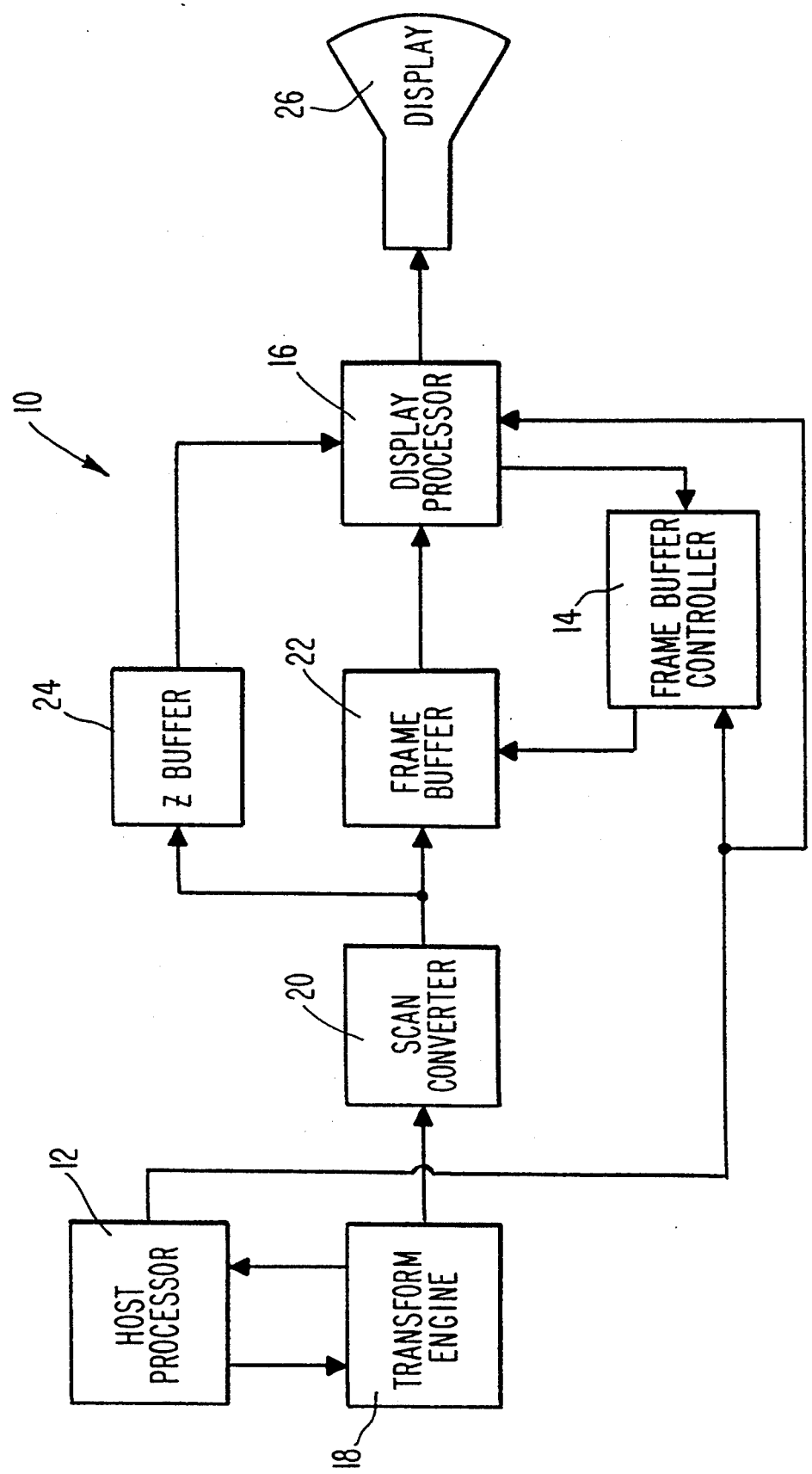
FIG. 1 is block diagram of a computer graphics system constructed in accordance with the present invention.

A new and novel graphics system is shown in FIG. 1 and generally designated 10. Graphic system 10 is shown to include a host processor which generates graphics commands as well as providing a display signal generated by the application or application in operation in the computer. The graphics commands are provided to frame buffer controller 14 and display processor 16. The display signal is provided to a transform engine 18 where display signal, which at this point is primarily mathematical representations, is transformed into pixel information, i.e. screen coordinate data. It is preferred that pixel information include image information (color information), overlay data, window identification data and display mode data. As will be described in greater detail hereafter, the image information preferably includes twenty four bits while the overlay, window identification and display mode data each include four bits.

The pixel information generated by transform engine 18 is provided to scan converter 20 which converts the pixel information into scan line format. In other words, the information relating to each pixel is ordered such that each pixel is arranged in scan line sequence. The converted pixel information is thereafter provided to frame buffer 22 and Z buffer 24. Pixel information is stored in and read from frame buffer 22 in response to control signals generated by frame buffer controller 14. Pixel information read from frame buffer 22 and Z buffer 24 is provided to display processor 16 which formats pixels into their correct display formats based upon display mode information stored in frame buffer 22. Correctly formatted pixel information is provided to random access memory (RAM) digital to analog converter (DAC) 25, which in the preferred embodiment includes a color look up table and which converts pixel information from digital form to a series of analog signals designed to achieve the desired pixel image on color display 26. In the preferred embodiment, such analog signals include an analog signal for each color gun (not shown) of display 26, i.e., red, green and blue, and an analog signal representative of α information.

Figure 2:
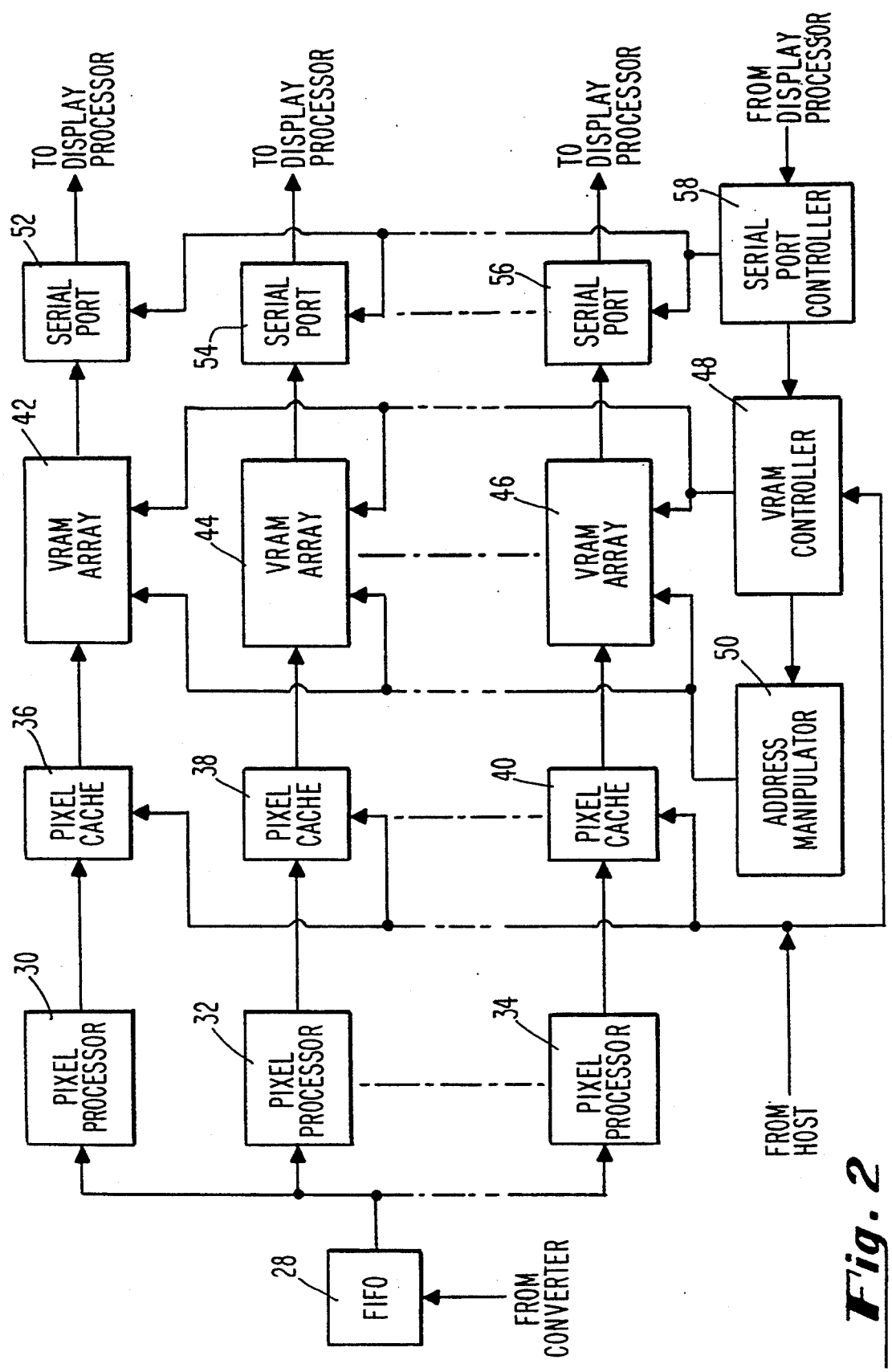
FIG. 2 is a more detailed block diagram of the frame buffer and frame buffer controller depicted in FIG. 1.

Referring now to FIG. 2, frame buffer 22 and frame buffer controller 14 will be more particularly described. As shown in FIG. 2, pixel information provided by scan converter 20 is supplied to a first-in-first-out (FIFO) processor 28. FIFO 28 acts as a temporary buffer for pixel information and provides the buffered pixel information to pixel processors 30, 32 and 34. In the preferred embodiment there are four pixel processors, only three are depicted. Each pixel processor processes pixel information representative of image data, i.e., color and intensity data, Z buffer data and α data for a given scan line. Since four pixel processors are utilized, up to four scan lines of data can be processed. Window, overlay and display data, as will be described herein is not processed by the pixel processors, but rather is stored in the frame buffer during non-rendering operations.

Pixel processors 30, 32 and 34 each read pixel information from FIFO 28 simultaneously and it is preferred that the beginning of each read operation does not start until all pixel processors are ready to read information from FIFO 28, i.e. until all pixel processors have completed processing data associated with a given scan line. While all pixel processors operate on the same commands and data in parallel from FIFO 28, each processor restricts itself to only those pixels which have predetermined addresses (scan lines) associated with the particular processor. Once a read operation is begun, it is preferred that each pixel processor output pixels at its own rate. Each of the pixel processors operates to output pixels along a given logical scan line, also referred to as a span.

Pixel information output by pixel processors 30, 32 and 34 is provided to pixel caches 36, 38 and 40. Although the pixel caches will be generally described herein, such pixel caches are more particularly described in application Ser. No. 495,005, filed Mar. 16, 1990 and entitled "Arithmetic And Logic Processing Unit For Computer Graphics System" which is hereby incorporated by reference. Such pixel caches are also more particularly described in application Ser. No. 669,801 filed Mar. 15, 1991 entitled "Data Rotator Means" which is hereby incorporated by reference.

Similar to pixel processor 32, pixel cache 38 is preferably utilized in relation to pixel information representative of a single color, namely, red. Separate pixel caches (not shown) will preferably be utilized for each of the other primary colors (green and blue).

Pixel caches 36, 38 and 40 act as the caches of pixels between the bulk storage devices of frame buffer 22 and pixel processors 30, 32 and 34. Each pixel cache can hold several tiles, i.e., a 1×4 group of pixels. Basically, the pixel caches accept pixel information associated with a logical scan line and operate to place this data at a physical scan line location related to display 26. Data are addressed within pixel caches 36, 38 and 40 via logical addresses, however, such pixel information is written into bulk storage using physical addresses.

Figure 3:
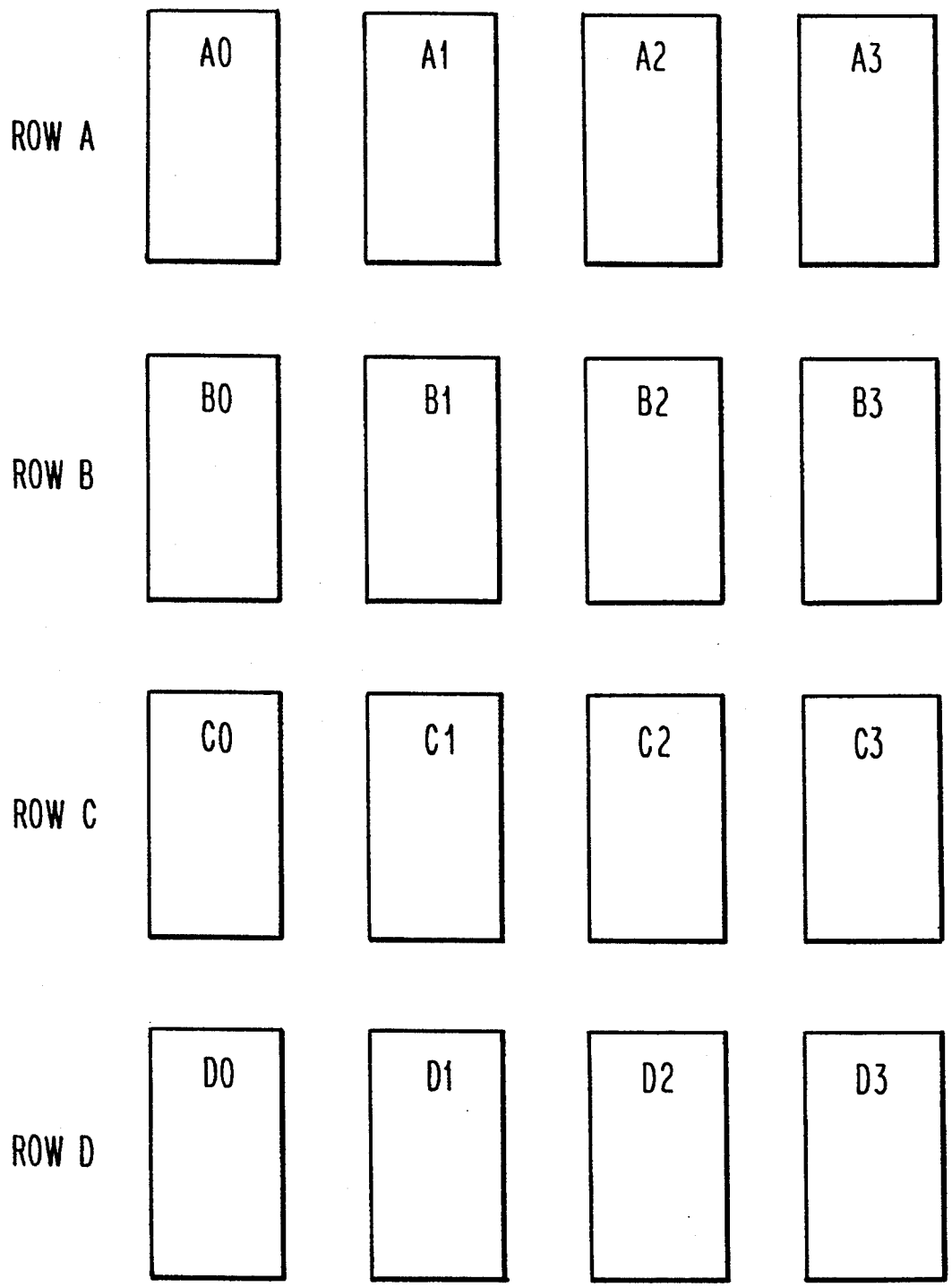
FIG. 3 is a more detailed block diagram of a VRAM array contained in the frame buffer depicted in FIG. 2.

Pixel information provided by pixel caches 36, 38 and 40 are supplied to VRAM arrays 42, 44 and 46. As will be described in greater detail herein, each VRAM array comprises a plurality of individual VRAM devices. In the preferred embodiment, each VRAM device is a 128K×8 VRAM device. It will be understood that each VRAM device will contain 8 bits of pixel information for a given pixel. It is also preferred that the VRAM devices be arranged in a 4×4 matrix. In other words, each VRAM array 42, 44 and 46 contain sixteen individual VRAM devices arranged in a 4×4 matrix, shown in FIG. 3.

The storage and retrieval operations of pixel information in relation to VRAM arrays 42, 44 and 46 is controlled by VRAM controller 48 and address manipulator 50. Pixel information read from VRAM arrays 42, 44 and 46 are provided to serial port devices 52, 54 and 56. Serial ports 52, 54 and 56 act as a collection point of pixel information so that all information relating to a particular pixel can be provided to display processor 16 simultaneously. The operation of serial ports 52, 54 and 56 are directed by serial port controller 58.

It will be appreciated that the retrieval of pixel information for display on display screen 26 at times concurrently involves the retrieval of clipping and display mode information for use in generating the display. In the past, such clipping and ,display mode information for a single pixel has been contained in a single plane within the frame buffer for controlling the clipping and display of rendered graphics primitives. It will be understood that graphics primitives to be rendered are limited by limiting the writing of such primitives to regions of the frame buffer which have an address matching selected clipping addresses contained in the clipping information. Display mode information, as indicated previously, is used to control the selection of a display mode control, i.e., display enables, color maps and index modes, which display mode controls are applied in the process of displaying regions of frame buffer 22 to display 26.

In the present invention, clipping planes and display mode planes associated with each pixel are separated from one another. Such separation is seen to achieve several advantages. A dissimilar number of clipping and display indexes can be created. Moreover, display mode plane indices can be shared by regions having different clipping requirements. Still further, clipping indices may be dynamically allocated without affecting the visual appearance of pixel information contained in the frame buffer as such information is displayed on display 26.

Referring now to FIG. 4, a more detailed description of VRAM arrays 42, 44 and 46 will be given. As shown in FIG. 4, two of the sixteen VRAM devices (FIG. 3) are depicted. For purposes of illustration, this description will be in relation to VRAM array 42, however, it will be noted that each VRAM array is constructed substantially identically. VRAM array 42 is shown to include VRAM devices 60 and 62. Device 60 has been designated VRAM A and device 62 has been designed VRAM B. Information from pixel cache 36 is provided simultaneously to the inputs of VRAMA and VRAMB. Control signals provided by VRAM controller 48 and address manipulator 50 will determine whether pixel information presented to the input of VRAMA or VRAMB is actually stored therein. It will also be noted that the designations A and B are meant to identify subsequent scan lines. In other words, pixel information stored in VRAM A will appear on scan line A while pixel information stored in VRAM B will appear on scan line B.

VRAM 60 is shown to include a random access memory portion 64, which random access memory 64 includes a first section 66 and a second section 68. Pixel information is retrieved from random access memory 64 in response to the control signals provided VRAM controller 48 and address manipulator 50 and such retrieved pixel information is transferred from random access memory 64 to shift register 70.

Similarly, VRAM 62 includes a random access memory portion 72 which random access memory 72 includes a first section 74 and a third section 76. Pixel information is retrieved from random access memory 72 in response to control signals from VRAM controller 48 and address manipulator 50 and such retrieved pixel information is transferred to shift register 78.

The control signals generated by VRAM controller 48 and address manipulator 50 operate to control the storage of information in sections 66 and 74 and further operate to store clipping information associated with a given pixel in second section 68 and display mode information associated with that same pixel in third section 76.

As will be appreciated from the above, the collective memory in frame buffer 22 is divided into first, second and third memory sections. Pixel information is stored in the first memory section, while clipping information and display information are stored in the second and third sections, respectively. In this manner, the display information and clipping information are separate from one another. In the preferred embodiment, the clipping member or clipping information is a window clipping plane and the display member or display information is a display mode plane. Pixels to be displayed on display 26 within the window clipping plane are displayed in window defined by the window clipping plane. In other words, only pixel information appearing within the window clipping plane boundaries will be displayed. Similarly, pixels to be displayed within a display mode plane are displayed in a given display mode if the pixel is located within a boundary defined by the display mode plane.

As shown in FIG. 4, frame buffer 22 includes a 4×4 array of VRAM devices. In this embodiment, second memory section 68 is physically stored in a first set of VRAM devices, for example, devices A0–A3. The third memory section 76 is stored in a second set of VRAM devices, such as devices B0–B3. In such an arrangement, the clipping plane and display mode plane are contained in physically separate VRAM devices. It is recognized that storage of the clipping plane and display mode plane in separate VRAM devices adds to the expense of a frame buffer, however, in view of the advantages described above, such additional expense appears warranted.

As shown in FIG. 2, frame buffer 22 include pixel caches 36, 38 and 40. In an especially preferred embodiment, clipping information and display mode information are stored in the pixel caches and transferred to second section 68 and third section 76 in response to a control signal from host 12. In this regard, host 12 operates as a controller for generating control signals representative of pixel transfer commands. In a still further embodiment of the present invention, second section 68 and third section 76 affect the display of pixels in first and second regions on display 26, wherein such regions coincide for plurality of common pixels.

While the invention has been described and illustrated with reference to specific embodiments, those skilled in the art will recognize that modification and variations may be made without departing from the principles of the invention as described herein above and set forth in the following claims.

What is claimed is:

1. A frame buffer for use in a computer graphics system for the storage and retrieval of pixel information, wherein said system comprises a screen display, said screen display comprising a plurality of scan lines wherein each scan line comprises a plurality of pixels, wherein each pixel has pixel information associated therewith and wherein said system provides clipping information and display mode information, said frame buffer comprising:

a plurality of processors for generating said pixel information, wherein each processor generates pixel information for separate scan lines, wherein said processors operate in parallel in the generation of said pixel information;

first and second memory means for storage of pixel information generated by one of said processors wherein each memory means provides storage for pixel information associated with separate scan lines, each of said memory means comprising a random access memory, wherein said random access memory comprises first and second memory sections;

said clipping information for use in the display of said pixel information to a first region of said display screen, wherein said clipping information is stored, for at least one of said scan lines, in said second memory section said first memory means; and said display mode information for use in the display of said pixel information to a second region of said display screen, wherein said display mode information, associated with said at least one of said scan lines is stored in said second memory section of said second memory means, so that said clipping information and said display mode information are stored in said random access memory in locations physically separate from one another.

2. The frame buffer of claim 1, said clipping information for use in multiple window clipping planes and said display mode information for use in multiple display mode planes wherein pixels to be displayed within each window clipping plane are displayed in a given window on said display screen and wherein pixels to be displayed within each display mode plane are displayed in a given display mode on said display screen.

3. The frame buffer of claim 2, wherein each of said memory means comprises a VRAM device.

4. The frame buffer of claim 3, wherein said second memory sections of said first memory means is contained in a first set of VRAM devices and wherein said second memory section of said second memory means is contained in a second set of VRAM devices, so that said clipping plane and said display mode plane are contained in physically separate VRAM devices.

5. The frame buffer of claim 1, wherein said system comprises a controller for generating control signals representative of pixel information transfer commands for transferring pixel information to said first and second memory means and wherein said frame buffer further comprises a pixel cache, wherein said clipping information and display mode information are stored in said pixel cache and transferred to said second sections of said first and second memory means in response to said control signals.

6. The frame buffer of claim 1, wherein said first and second regions coincide to a plurality of common pixels.

7. A method for use in a computer graphics system for the storage and retrieval of pixel information, wherein said system comprises a plurality of random access memories and a screen display, said screen display comprising a plurality of scan lines wherein each scan line comprises a plurality of pixels, wherein each pixel has pixel information associated therewith, wherein each of said random access memories is associated with one of said scan lines, said method comprising the steps of:

dividing each of said random access memories into first and second memory sections;

concurrently generating pixel information for a number of said scan lines, so that said pixel information is generated in parallel;

storing pixel information associated with at least one scan line in said first memory section of one of said random access memories;

providing clipping information associated with said at least one scan line to said one of said random access memories, said clipping information for use in the display of said pixel information in a first region of said display screen;

storing said clipping information in said second memory section of said one of said random access memories;

providing display mode information associated with said at least one scan line to another of said random access memories, said display mode information for use in the display of said pixel information in a second region of said display screen; and storing said display mode information in said second memory section of said another of said random access memories, so than said clipping information and said display mode information are stored in said random access memories in locations physically separate from one another.

8. The method buffer of claim 7, wherein said step of storing clipping information comprises storing multiple window clipping planes and wherein said step of storing display mode information comprises storing multiple display mode planes wherein pixels to be displayed within said window clipping planes are displayed in a window on said display screen and wherein pixels to be displayed within said display mode planes are displayed in a given display mode on said display screen.

9. The method of claim 8, wherein said random access memory comprises an array of VRAM devices, wherein said second memory section of said one of said random access memories is contained in a first set of VRAM devices and wherein said second memory section of said another of said random access memories is contained in a second set of VRAM devices, so that said steps of storing said clipping plane and said display mode plane comprises storing said clipping plane and said display mode plane in physically separate VRAM devices.

10. The method of claim 7, wherein said system further comprises a pixel cache and a controller for generating control signals representative of pixel information transfer commands for transferring pixel information from said pixel cache to said plurality of random access memories and wherein said method further comprises preliminarily storing said clipping information and display mode information in said pixel cache and wherein said steps of storing said clipping information and said display mode information comprises transferring said clipping information and said display mode information to said second sections of said random access memories in response to said control signals.

11. A computer graphics system comprising:
a host processor for generating a desired digital information signal;
a transform engine, connected to said host processor, for converting said information signal into a digital display signal;
a scan convertor, connected to said transform engine, for converting said digital display signal into pixel information arranged in scan line format;
a display processor for converting pixel information presented in scan line format into an analog signal suitable for display on a display device;

a screen display, said screen display comprising a plurality of scan lines wherein each scan line comprises a plurality of pixels, wherein each pixel has pixel information associated therewith; and a frame buffer, connected between said scan convertor and said display processor, for the storage and retrieval of pixel information, said frame buffer comprising:

a plurality of processors for generating said pixel information, wherein each processor generates pixel information for separate scan lines, wherein said processors operate in parallel in the generation of said pixel information;

first and second memory means for storage of pixel information generated by one of said processors wherein each memory means provides storage for pixel information associated with separate scan lines, each of said memory means comprising a random access memory, wherein said random access memory comprises first and second memory sections;

said clipping information for use in the display of said pixel information to a first region of said display screen, wherein said clipping information is stored, for at least one of said scan lines, in said second memory section of said first memory means; and said display mode information for use in the display of said pixel information to a second region of said display screen, wherein said display mode information, associated with said at least one of said scan lines is stored in said second memory section of said second memory means, so that said clipping information and said display mode information are stored in said random access memory physically separate from one another.

* * * * *

UNITED STATES PATENT AND TRADEMARK OFFICE
CERTIFICATE OF CORRECTION

PATENT NO. : 5,448,264
DATED : Sep. 5, 1995
INVENTOR(S) : David Pinedo, Byron Alcorn, Desi Rhoden It is certified that error appears in the above-indentified patent and that said Letters Patent is hereby corrected as shown below:

Claim 4, Col. 7, l. 35: "sections" should read --section--

Signed and Sealed this

Third Day of December, 1996

Attest:

BRUCE LEHMAN

*Attesting Officer*  *Commissioner of Patents and Trademarks*